United States Patent

Wellington et al.

[15] 3,666,193

[45] May 30, 1972

[54] TAPE REEL DRIVE TURNTABLE

[72] Inventors: Charles K. Wellington, Westford; Dietrich Jung, Belmont; George A. Kwasniewski, Wellesley, all of Mass.

[73] Assignee: Viatron Computer Systems Corporation, Bedford, Mass.

[22] Filed: Dec. 2, 1969

[21] Appl. No.: 881,406

[52] U.S. Cl. ....................242/68.3, 242/199
[51] Int. Cl. ....................B65h 17/02, B65h 75/00
[58] Field of Search....................242/68.3, 199, 200, 201, 210

[56] References Cited

UNITED STATES PATENTS 3,423,038 1/1969 Katzef et al....................242/199
3,456,892 7/1969 Krumbein et al....................242/68.3

*Primary Examiner*—George F. Mautz
*Assistant Examiner*—Gregory A. Walters
*Attorney*—Charles Hieken

[57] ABSTRACT

An improved turntable for holding and driving reels of magnetic recording tape and other tapes and particularly for such tapes when supplied in sealed magazines which include cooperating supply and take-up spools. The turntable is preferably formed of a single piece of material and includes reel engaging bars having curved centering surfaces at their ends so that the magazine with its spools may be pressed onto the turntable without regard to the particular reel position. This facilitates the insertion of the magazine onto a recording or playback device and provides a drive turntable without backlash and tape flutter.

3 Claims, 5 Drawing Figures

PATENTED MAY 30 1972

3,666,193

INVENTORS
CHARLES K. WELLINGTON
BY DIETRICH JUNG
GEORGE A. KWASNIESKI

ATTORNEY

TAPE REEL DRIVE TURNTABLE

BACKGROUND OF THE INVENTION

This invention relates to an improved turntable or drive spindle for reels or spools used to supply or pick up tape such as magnetic recording tape. These reels include teeth or lugs or other members on their hub which couple them to the driven turntables so that the reels rotate with the turntables. Present turntables being used with tape reels, and particularly those used with cassettes or magazines including both a supply and a take-up reel, having relatively complicated spring loaded members for forming the detachable coupling between the turntable and the reel hub. These turntables are both complicated and expensive to make and also have caused problems in use both with respect to loading the reels onto the turntables and with respect to damage or failure of the various moving turntable parts. The present turntables also do not provide a snug fit so that there is a backlash between turntable and reel hub and a resultant tape flutter.

The turntable of the present invention is relatively simple and in particular is adapted for being formed from a single piece of material either of molded or machined plastic or metal. In particular, the turntable includes an especially shaped or rounded end and cooperating reel engaging bars to facilitate the application of the reels to the turntable and to thereafter insure a firm coupling between the reels and the turntable.

Accordingly, an object of the present invention is to provide an improved turntable or spindle for tape reels or similar reels.

Another object of the present invention is to provide a simplified turntable or reel drive adapted for being formed from a single piece of material.

Another object of the present invention is to provide an improved turntable or spindle for tape reels without moving coupling members.

Another object of the present invention is to provide an improved turntable or spindle for a tape drive which facilitates the insertion of a cassette or magazine having a plurality of the reels.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein.

DESCRIPTION OF THE PREFERRED EMBODIMENT

Figures 1, 2, 3, 4, 5:
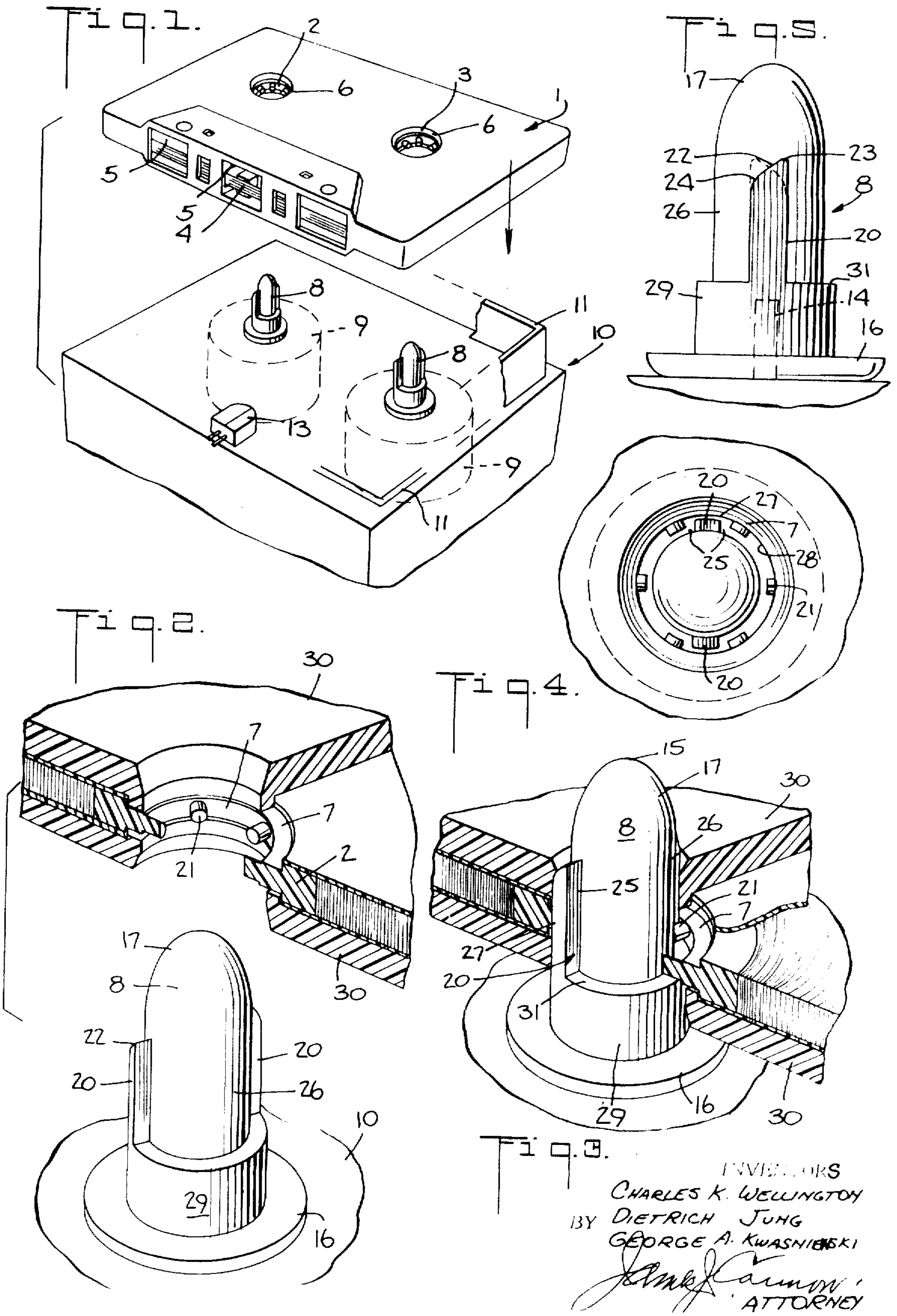
FIG. 1 is a perspective view illustrating a typical cassette or magazine including a pair of tape reels being inserted onto a drive including turntables in accordance with the present invention.
FIG. 2 is an enlarged fragmentary perspective view showing the hub portion of a tape reel being applied to a turntable in accordance with the present invention.
FIG. 3 shows the reel hub and turntable of FIG. 2 in their coupled position.
FIG. 4 is a fragmentary enlarged top plan view showing the tape reel hub in position on the turntable of the invention.
FIG. 5 is an enlarged side elevational view of the preferred turntable in accordance with the present invention.

FIG. 1 illustrates a typical cassette 1 for a tape recording system in which a supply reel 2 and a take-up reel 3 are rotatably mounted to pass the recording tape 4 from one to the other in either direction. The cassette 1 is seen to have several openings 5 to expose a portion of the tape 4 between reels 2 and 3 for engagement with the tape recording or pick-up heads 13. It is also seen to include spaced apertures 6 which expose the hub portions 7 of the tape reels 2 and 3 by which the reels 2 and 3 are coupled to the drive system. The drive portion of a tape deck is illustrated beneath the cassette 1. It is seen to include two turntables 8 formed in accordance with the present invention and which are each coupled to separate drive motors 9. This permits the motors 9 to be alternatively energized to rotate the turntables 8 in opposite directions permitting the tape 4 to be moved from the supply reel 2 to the take-up reel 3 or vice versa. Other drive means may be used with the turntables of the present invention including remotely coupled drive motors.

As illustrated in FIG. 1, the cassette 1 is moved downwardly over the turntables 8 when being placed in operative position with the hub portions 7 of each reel being simultaneously engaged with the turntables 8.

The tape deck 10 or other recorder arrangement adjacent to the turntables 8 includes suitable guide members 11 for spacing the cassette 1 above the turntable mounting surface and for precisely positioning the cassette 1 or magazine with respect to the center lines or axes of rotation of the two turntables 8. These guide members 11 may be fixedly positioned as illustrated or, alternatively, a pivoted or slidably mounted cassette support may be provided which is arranged to provide for the necessary downward movement of the cassette 1 onto the turntables 8.

The preferred embodiment of the turntables 8 in accordance with the present invention is illustrated in detail in FIGS. 2 through 5. Each turntable 8 will be mounted on a drive shaft 14 having its axis of rotation aligned with the rotational axis of the turntable 8. These drive shafts 14 may be the motor shafts for the motors 9 illustrated in FIG. 1 or they may be independent remotely driven shafts suitably coupled to a driving system. The turntables 8 include a mounting means for being coupled to the drive shaft 14 which conveniently comprises a suitably proportioned hole 15. Each turntable 8 includes a body portion which may have a projecting protective flange 16 provided at its bottom. The upper portion or tops of the turntables 8 are rounded, as illustrated at 17, to form a guide surface to direct the cassette 1 onto the turntables 8 as the hubs 7 of the tape reels 2 and 3 are pressed onto the turntables 8.

This surface 17 may be generally hemispherical. The central portions of the turntables 8 include a pair of elongated radially extending coupling bars 20 for engaging inwardly extending driving lugs 21 on the hubs 7 of the tape reels 2 and 3.

FIG. 2 illustrates a preferred form of the tape reel lugs 21 which comprises radially inwardly directed lugs 21 having a general circular cross-section. The bars 20 on the turntables 8 are seen to include upper centering slopes 22 which have about a 45° angle with respect to the turntable axes and which also have slightly rounded upper and lower edges 23 and 24. These slopes which have opposite directions, when viewed as in FIG. 5, insure the necessary relative rotation between the turntables and the reel hubs 7 should a lug 21 strike a bar 20. The circumferential dimension of the inner portions 25 of the bars 20 is preferably fixed to clear the closest portions of two adjacent lugs 21 as best illustrated in FIG. 4. When the cassette 1 is inserted downwardly onto the turntables 8, the rounded lug 21 surfaces will be seen to engage the sloping centering surfaces 22 on the turntable bars 20 thereby causing relative rotation between the tape reels 2 or 3 and the turntables 8 to move the bars between the hub lugs 21 to the position illustrated in FIG. 4. The radial dimension of the reduced diameter top portion 26 of each turntable 8 is fixed so that the lugs 21 just clear this surface as, for example, with a clearance of about 0.005 inches and the outermost radial dimension of the arcuate outer surface 27 of the bars 20 is fixed so that the surface 27 is clearly spaced from the inner hub surface 28 between adjacent lugs 21 as, for example, with a clearance of 0.025 inches. The lower portion 29 of the turntable 8 below the bars 20 has its outermost dimension fixed so that it may freely enter the aperture 6 provided in the cassette 1 covers 30.

In the preferred embodiment, two bars 20 are provided on diametrically opposed portions of the turntable 8 to facilitate the seating of the cassette 1 on the turntables 8 and to provide for a smooth uniform drive action. As indicated above, the distance between the outer surfaces 27 of the two bars 20 is made to clear the adjacent surfaces 28 of the hub 7 and a lesser spacing is provided between the turntable surface 26 and the lugs 21 on the hub 7 of the tape reel to permit a slight self-adjustment or rocking motion of each hub 7 on its turntable 8.

FIG. 2 shows a cassette 1 being moved downwardly onto the turntable 8 and FIG. 3 shows the cassette 1 in its final or drive position after the centering slopes 22 on the two bars 20 have engaged the hub lugs 21 to provide for the necessary adjusting movement of the hubs 7 or the turntables 8 to fit the hubs 7 in the manner illustrated in FIG. 4.

In most cassettes or magazines, the tape reels are movably positioned so that they will readily rotate the small amount necessary to provide for the adjustment of the turntable and the reel hub positions. In many tape drives, rotation of the turntables is also possible when the recording device is being loaded.

It will be seen that an improved turntable has been provided to facilitate the loading and the use of reel-type recording tapes. A turntable is provided which is relatively simple and rugged and which is adapted for being formed as a unitary member. The turntable also has self-positioning features which facilitates the placing of the tape hubs or reels onto the turntables by providing for a camming or self-adjusting action of the turntable or the tape reels. The turntable in accordance with the present invention for these reasons, and particularly in view of its easy loading and its snug coupling, are useful on cassette or magazine-type systems where two tape reels are contained within the magazine enclosure and are simultaneously applied to the recording system turntables.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

What is claimed is:

1. In a drive system for moving a tape back and forth between a supply reel and a take-up reel where the reels include hubs with reel mounting apertures and with inwardly projecting turntable engaging lugs and said system having a pair of spaced rotatably mounted turntables for engaging the hubs the improvement comprising said turntables being unitary members having generally cylindrical body portions with symmetrical rounded top portions, a pair of diametrically opposed elongated lug engaging bars on each turntable extending radially outwardly from the surface of the turntable body and extending parallel to the turntable axis, each of said bars having its top positioned below the rounded top portion of the turntable and sloping downwardly in a generally circumferential direction for engaging a reel lug for turning the turntable in one direction when engaging said reel lug, the radial distance between the radially outermost surfaces of said pair of bars being slightly less than the diameter of the hub mounting apertures, the shortest distance between two adjacent lugs on said reel hubs being slightly greater than the circumferential width of said bars, and an enlarged portion on each turntable body positioned below said bars having an upwardly facing support surface for said reel hub lugs.

2. The system as claimed in claim 1 in which the sloping tops of said turntable bars have their upper and lower ends rounded.

3. The system as claimed in claim 1 in which said reel hub lugs have a circular cross-section.

* * * * *